Aug. 14, 1934.  W. NUSSBAUM  1,970,430
MANUFACTURE OF NUTS FROM BALLS
Filed Feb. 12, 1930  6 Sheets-Sheet 1

Inventor
Wilhelm Nussbaum

Aug. 14, 1934.    W. NUSSBAUM    1,970,430
MANUFACTURE OF NUTS FROM BALLS
Filed Feb. 12, 1930    6 Sheets-Sheet 2

Inventor
Wilhelm Nussbaum

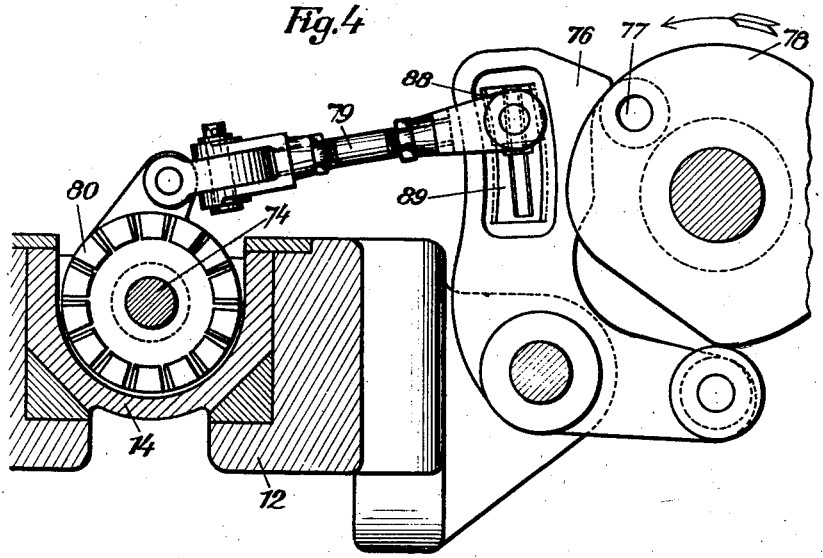
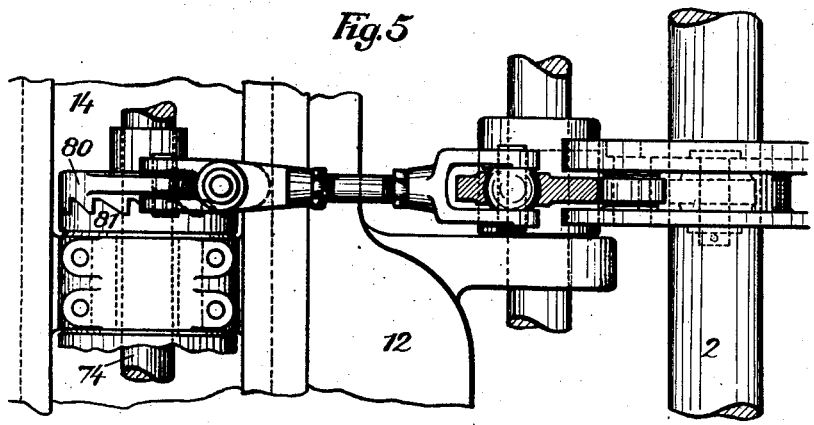

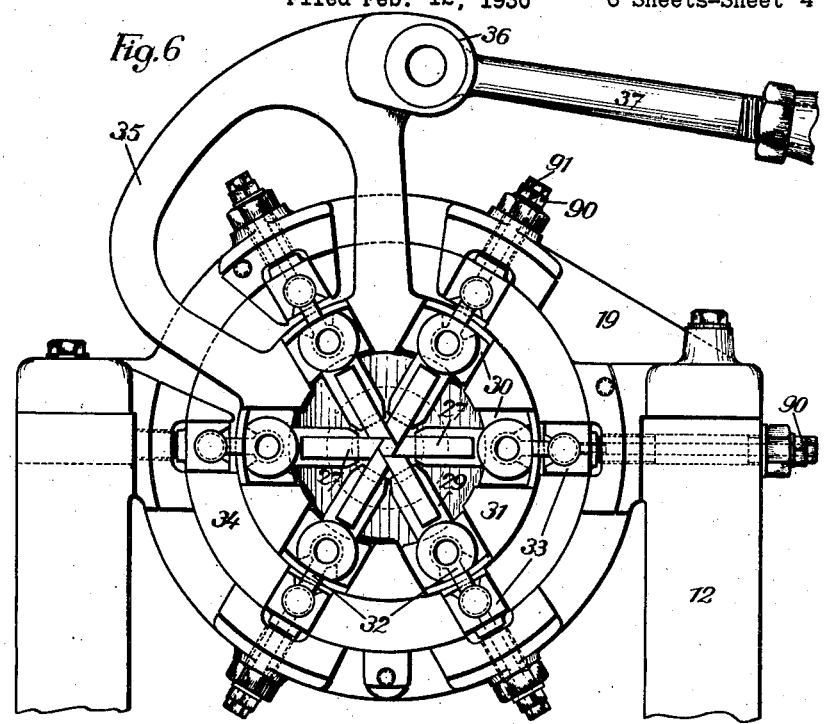
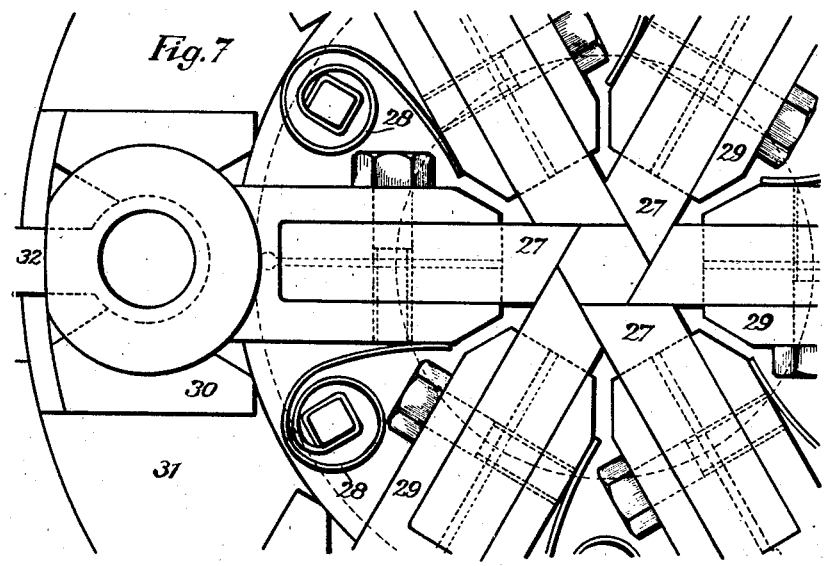

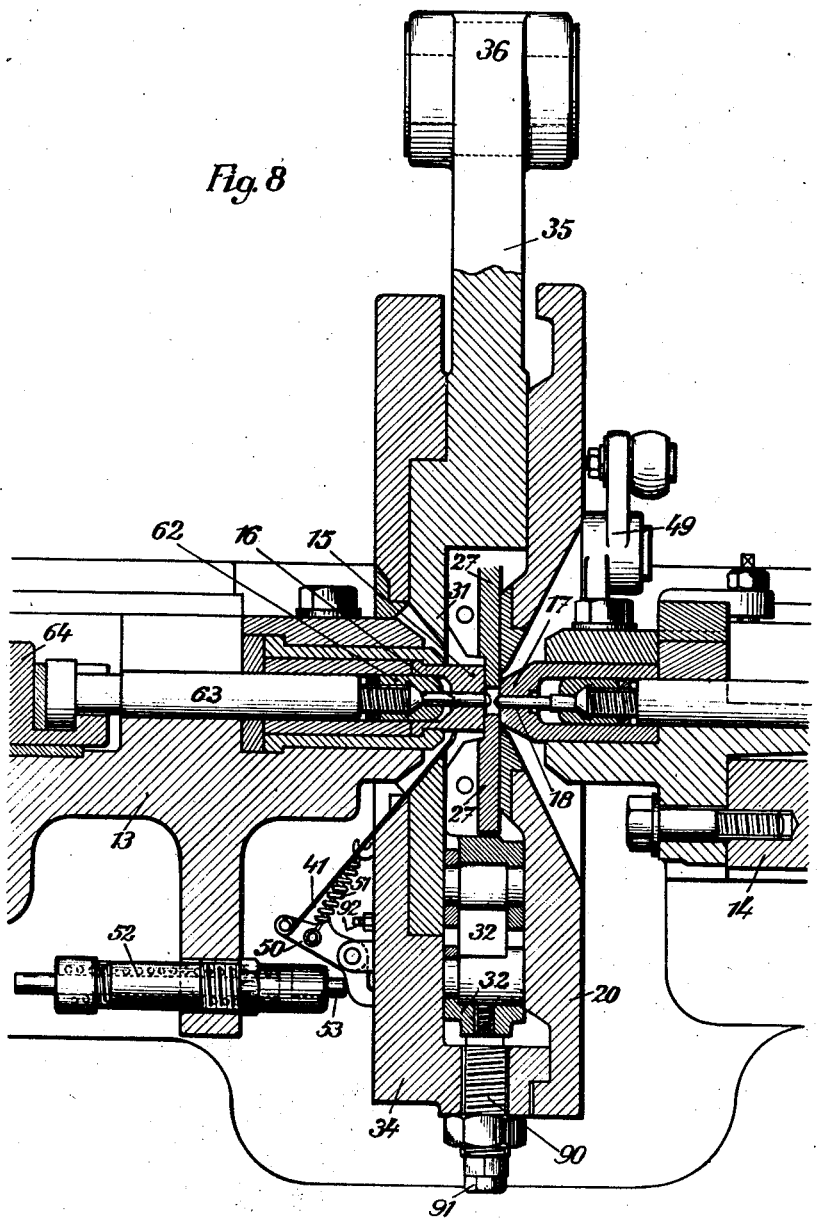

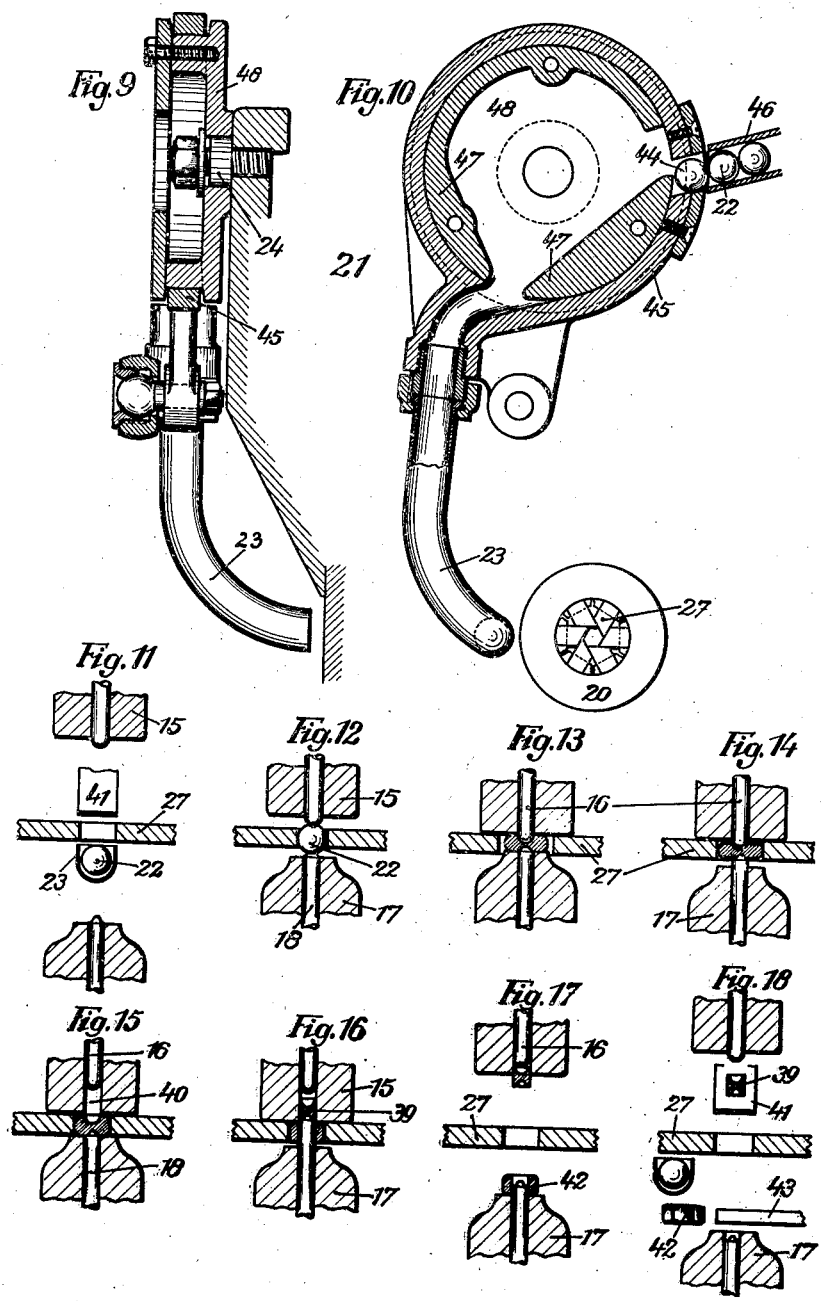

UNITED STATES PATENT OFFICE 1,970,430

MANUFACTURE OF NUTS FROM BALLS

Wilhelm Nussbaum, Dusseldorf, Germany

Application February 12, 1930, Serial No. 427,916
In Germany November 11, 1929

13 Claims. (Cl. 10—86)

This invention relates to a method and device for manufacturing nuts from balls.

The machine according to the invention differs from the known devices of this class in its general construction and in several features. One of these is that both the plunger and the matrix are each disposed on a separate displaceable carriage whereby, in addition to a considerable increase in output, the advantage is obtained that the stamped out cores and the finished nuts are discharged from the machine separately. Another feature consists in the provision of an ejecting mandrel which is guided in the matrix and, owing to a special control, penetrates the material to a considerable extent and displaces it towards the circumference of the blank, so that the material prior to being punched is considerably reduced and the total waste diminished to approximately 15 per cent. The movable ejecting mandrel removes the core from the matrix and in connection with the movable matrix and plunger assists in quickly and reliably discharging the core and the nut on different paths, which accelerates operation and increases the output to a considerable extent. The individual working members for producing the nut are constructed so as to meet the requirements of increased output. There are further means provided for compressing the material to a thickness which is smaller than that of the finished nut, so that the circumference of the blank is enlarged and the nuts may be fully shaped during the pressing of the hexagon faces.

Figure 1:
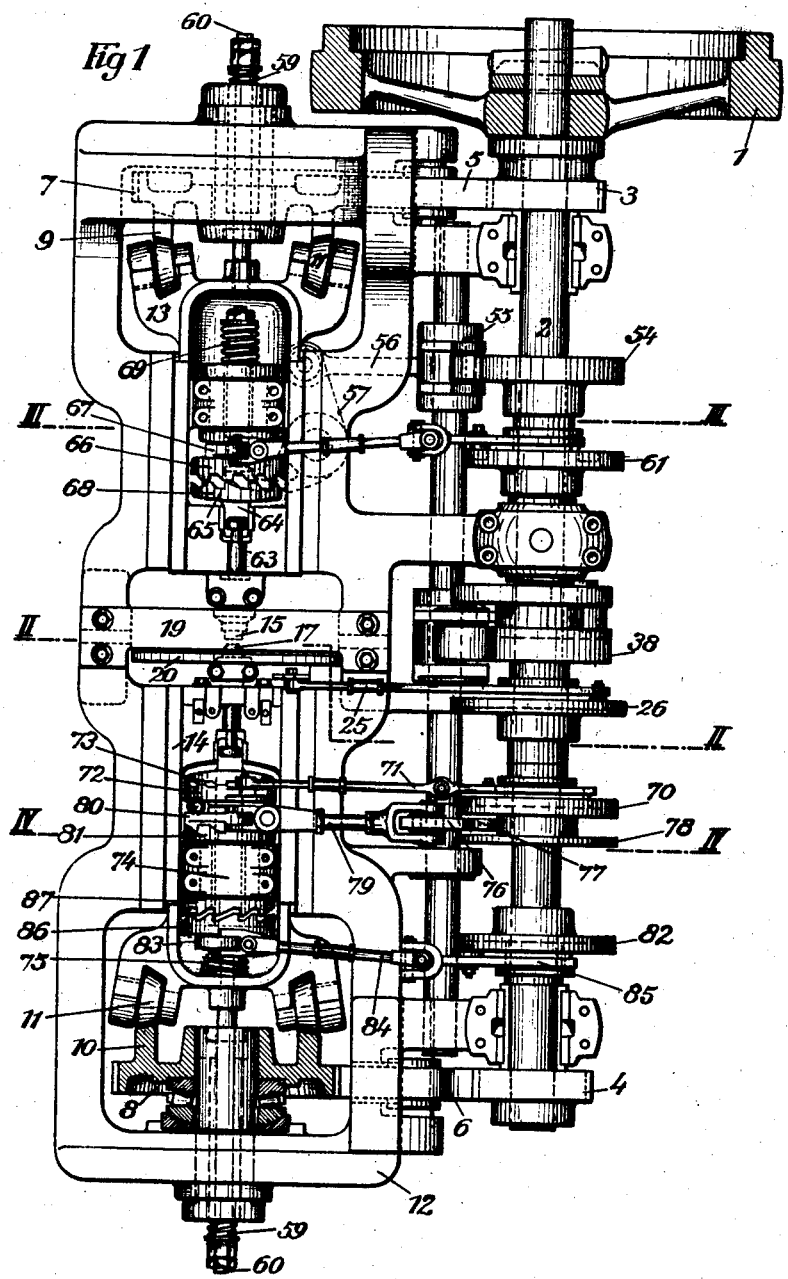
Figure 2:
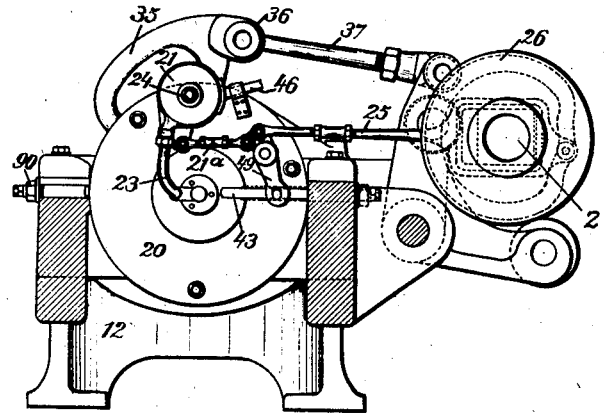
Figure 3:
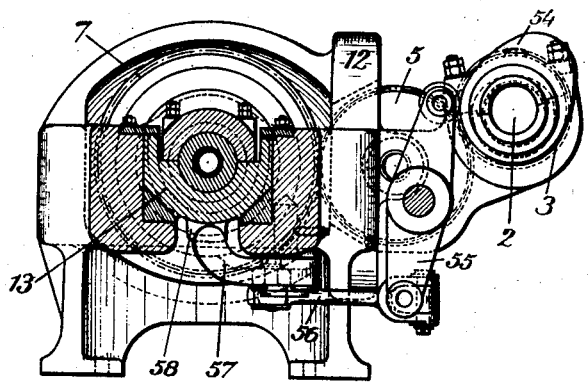

The general and special improvements according to the invention are described below and illustrated in the accompanying drawings, in which Figure 1 is a plan of the machine; Fig. 2, a cross section on the line 2—2, of Fig. 1; Fig. 3, a cross section on the line 3—3, of Fig. 1; Fig. 4, a cross section on the line 4—4, of Fig. 1; Fig. 5, a plan of Fig. 4; Fig. 6, a side elevation of the iris arrangement and its parts with the cover removed; Fig. 7, a partial view of Fig. 6 on an enlarged scale; Fig. 8, a longitudinal section of the iris arrangement; Fig. 9, a cross section of the ball feed; Fig. 10, a longitudinal section thereof; and Figs. 11 to 18 are detail views showing the successive stages in the production of the nut and the positions of the nut producing tools during the various operations.

Referring to the drawings, the shaft 2 driven by the fly-wheel 1 carries the cams for controlling the different motions of the machine. The shaft 2 carries also two gear wheels 3 and 4 meshing with the intermediate gear wheels 5 and 6 which engage the gear wheels 7 and 8, the number of teeth of the wheels 7 and 8 being twice that of the wheels 3 and 4. The gear wheels 7 and 8 possess projecting cam races 9 and 10 the curve-shape of which is repeated twice in the circumference at the ratio of the gear wheels 7 and 8 to the wheels 3 and 4. The carriages 13 and 14 displaceably guided in the machine frame 12 are reciprocated by means of the rollers 11. The carriage 13 carries a matrix 15 on its front face directed towards the iris 19, and in the matrix 15 a mandrel 16, as shown in Fig. 8, is displaceably guided for ejecting the nut core from the matrix. The opposite carriage 14 is provided with a plunger 17 which faces the iris 19, as shown in Fig. 1, and in which the punch 18 is displaceably disposed. Between the two carriage heads the iris 19 is arranged which produces the nut, the inside of the iris 19 being covered by the plate 20. As indicated in Fig. 10, a ball feeder 21 is positioned in front of the plate 20 for feeding a fresh ball 22 to the iris 19 at each revolution of the shaft 2.

The operation of the machine and the production of the nuts are carried out as follows:

A nut is finished at each revolution of the shaft 2. Owing to their gear ration of 1:2, the gear wheels 7 and 8 and the cam races 9 and 10 carry out only one-half rotation at each revolution of the shaft 2, so that the shape of the curve is covered twice by the cam race and both rollers 11 of the carriages 13 and 14 always hug the cam races 9 and 10, as indicated in Fig. 10. A ball 22 is contained in the feed pipe 23 of the ball inserting device 21 secured to the cover plate 20 by the bolt 24. As shown in Figs. 1 and 2, the outlet of the feed pipe 23 is moved by the cam 26 and the transmission rods 25 towards the center of the iris 19 to enable the ball 22 previously held back by the cover plate 20 to come out and run between the opened shaping tools 27. This position is shown in Fig. 11. The shaping tools 27 are arranged in the form of an iris in such a way that their end faces form a hexagonal hollow mold which is increased or decreased in size according to the motion of the tools, as indicated in Fig. 7. The shaping tools 27 mutually support each other and their end faces are inclined relative to the working direction whereby the joints between the elements of the hollow mold will close the more tightly the greater the shaping pressure is and material is effectively prevented from entering the joints and between the parts of the mold. By means of the springs 28 secured to the iris casing and acting on the tool holders 29 the shaping tools 27 are always closely held in superposed position even when the machine is running light, so that the smooth introduction of the ball into the hollow hexagonal mold is always insured. The tool holders 29 are hingedly mounted in the sliding members 30 guided in slots of an oscillatory ring 31 and connected by the hinge bolts 32 with the supporting bearings 33 which are displaceably disposed in guide slots of the stationary iris casing 34. The ring 31 can be moved by means of the lever 35 and the fulcrum 36 to which a connecting rod 37 is attached. The narrowest position of the iris 19 is shown in Fig. 6. If the ring 31 is turned anticlockwise by the action of the cam 38 from the position shown, the shaping tools 27 are drawn back and the hollow hexagonal mold formed by them is widened. When the mold is suitably widened the ball 22 will roll out of the feed pipe 23 and between the shaping tools 27. The ring 31 is then turned by the cam 38 until the shaping tools 27 are in touch with the ball 22 on all six sides and thus center it. As soon as the shaping tools 27 grip the ball 22, the two carriages 13 and 14 with the pressure heads 15 and 17 as well as the mandrels 16 and 18 disposed therein are moved by the cam races 9 and 10 towards the ball 22 to such an extent that the mandrels 16 and 18 can enter into the ball for a distance and hold it in position, as shown in Fig. 12. The ring 31 is then turned clockwise by the cam 38 to withdraw the shaping tools 27 and to widen the hollow mold formed by them. The cam races 9 and 10 press the heads 15 and 17 with the mandrels 16 and 18 still farther towards the ball 22 which is thus flattened. The resulting circumferential enlargement of the blank is enhanced still more by the ejecting mandrel 16 which slightly projects from the matrix 15. The punch 18 also penetrates the material to a certain extent with the result that the material located between the mandrel 16 and the punch 18 and subsequently forming the core is considerably reduced. The narrowed end of the plunger 17 slightly enters the hollow mold, as shown in Fig. 13, and the flattened ball is thus placed in a somewhat one-sided position within the hollow mold. To bring the blank again into the center of the hollow mold the plunger 17 recedes slightly while the mandrel 16 advances a little and pushes the blank into the hollow mold.

Owing to the return motion of the plunger 17, the path is freed again for the motion of the shaping tools 27 which close again around the flattened blank, as indicated in Fig. 14. The mandrel 16 moves back into the matrix 15. By turning the ring 31 into the position shown in Figs. 6 and 7 the shaping tools 27 are brought into their closest relative position and the flattened ball is thus made into a hexagonal piece whose dimensions are final, as indicated in Fig. 15. The material assumes hexagonal shape on account of the shaping pressure from without and yields within the mold partly in longitudinal direction, so that it fills the hollow mold and attains a degree of thickness slightly in excess of that of the shaping tools 27. At the end of this operation the plunger 17 advances to smooth the end faces of the finished hexagonal blank, the faces of the nut being formed automatically owing to the original ball shape of the blank. The punch 18 then advances for the purpose of punching the blank, the core entering the bore of the matrix 15. To facilitate punching and to relieve the stresses in the blank the plunger 17 is slightly loosened, as shown in Fig. 16. The plunger 17 and the matrix 15 then recede simultaneously while the iris 19 begins to open, as indicated in Fig. 17. During the withdrawal of the plunger 17 the punch 18 is drawn into it while the ejecting mandrel 16 emerges from the receding matrix 15 and ejects the core 39. To cause the core 39 to drop out immediately and without fail and to prevent it from adhering to the point of the mandrel 16 the latter is shaken suddenly by means of a gap of known kind in the operating race 9 for the matrix carriage 13, and this shaking motion is transmitted to the mandrel 16 mounted therein.

As indicated in Fig. 8, the core 39 drops onto a catching chute 41 raised by the return of the carriage 13 behind the shaping tools 27. The punch 18 returns somewhat quicker than the plunger 17, carries along the finished nut 42 from the iris 19 and strips it off on the slower moving plunger 17 to free the nut. To prevent adherence of the nut 42 to the plunger 17 a special stripper 43 is provided which moves past the plunger 17 and pushes the nut 42 to the side, as indicated in Fig. 18.

During the return motion of the ball feeding device 21, as shown in Fig. 2, into its inoperative position an inlet opening 44, as shown in Fig. 10, of the oscillatory part 45 has passed a feed pipe 46 and taken a fresh ball therefrom. This ball 22 is prevented from rolling into the feeding device by a bridge 47 of the stationary part 48. Simultaneously with the advance of the stripper 43 the advance of the feeding device 21 takes place. Owing to the rotation of the member 45, the inlet opening 44 is lifted above the bridge 47 and the ball 22 rolls through the feeding device 21 into the open iris 19.

In the meantime, the catching chute 41 has been moved up to such an extent that its upper portion is situated behind the hollow iris mold and in this position serves as stop for the falling ball 22 to prevent the latter from dropping out on this side of the iris 19, as shown in Fig. 11. With the pipe 23 returns the stripper 43, since both members are controlled by the same cam 26 by means of the double lever 49, as indicated in Fig. 2.

The catching chute 41 is mounted on a bell crank 50 which is drawn up by the tension spring 51 and rotatably disposed on the stationary casing 34 of the iris 19 by means of a bolt. In a sleeve 52 secured to the carriage 13 a spring-actuated bolt 53 is mounted which, during the advance of the carriage 13, presses against the bell crank 50 and thus draws the catching chute 41 down and out of the operating range of the matrix 15 and the mandrel 16, as indicated in Fig. 8. During the return of the carriage 13 the spring 51 draws up the chute 41 to catch the ejected core 39 and to act as stop for the incoming ball 22. For accurately centering the incoming ball 22 a set screw 92 is provided which is hugged by the bell crank 50 so as to adjustably limit the extreme position of the part of the chute serving as stop.

The carriages 13, 14 are returned by a cam 54, a lever 55 and a connecting rod 56 which engages the bell crank 57, as shown in Figs. 1 and 3. The bell crank 57 abuts against a projection 58 of the carriage 13 and pushes back the latter when the cam 54 is in a corresponding position. A similar motion may be provided for the carriage 14 or it may be connected, for instance, in known manner by a wire rope and a pulley with the carriage 13, so that both carriages are moved back simultaneously by a single cam 54. The return motions of the carriages 13 and 14 are facilitated by the compression springs 59 arranged in the head ends of the machine frame 12 and compressed by the connecting rods 60 attached to the carriages 13, 14 when the latter are pushed forward by the cam races 9 and 10. The springs 59 keep the rollers 11 of the carriages 13, 14 continually in contact with the cam races 9, 10. The ejecting mandrel 16 is also moved forward and backward by the carriage 13 and, in addition, carries out a separate motion which is caused by the cam 61, as indicated in Figs. 1 and 8. The mandrel 16 is interchangeably secured with a cap 62 to a plunger 63 interchangeably disposed in a neck extension 64 of a displaceable yet not rotatable toothed disc 65 fixed on the sliding spindle of the ejecting mandrel 16, as shown in Fig. 1. An opposite toothed disc 66 can be rotated by a connecting rod and the cam 61 by means of a ratchet wheel 67 of known type. The end faces 68 of the teeth of the toothed discs 65 and 66 are slightly inclined. During the forward motion of the carriage 13 the toothed disc 66 is rotated so that the faces 68 of the teeth register in the position shown in Fig. 1 when the ejecting mandrel 16, as shown in Figs. 11 to 13, will project slightly from the matrix 15. The toothed disc 66 is then turned until the faces 68 of the teeth are superposed only slightly. Owing to this rotation and the incline of the faces 68, the toothed disc 65 and, therefore, the mandrel 16 will be advanced still more, the degree of inclination of the faces 68 corresponding to the extent the ball blank is moved by the mandrel 16 into the center of the hollow mold formed by the tools 27, as indicated in Fig. 14. By imparting a slight further turn to the toothed disc 66 the mandrel 16 is then withdrawn until the teeth are in meshing position and the previously tensioned compression spring 69 is capable of drawing the toothed disc 65 together with the mandrel 16 back into the position shown in Fig. 15.

During the advance of the carriage 14 the punch 18 emerges from the plunger 17 to such an extent as to slightly project from the end face of the latter. This advance of the punch 18 constitutes an additional motion and is caused by the cam 70 in connection with the control rod 71 and by the oscillatory toothed disc 72 cooperating with the toothed disc 73 on the spindle 74 of the punch 18, as shown in Fig. 1. This advance of the punch 18 is necessary to prevent portions of the material from entering the bore of the plunger 17 during the flattening and smoothing of the blank. To center the blank during operation the punch 18 is controlled by the spring 75. Punching takes place by moving the cam lever 76 by means of the roller 77 which rotates together with the double cam plate 70, 78, as shown in Figs. 1 and 4, and this motion is transmitted by the connecting rod 79 to the toothed disc 80 which advances during rotation on the stationary toothed disc 81 and transmits this motion to the spindle 74 and the punch 18. To withdraw the punch 18 from the nut 42 and into the bore of the plunger 17 the cam 82 is provided which controls the ratchet wheel 83 by means of the connecting rod 84 and the guide fork 85. As shown in Figs. 4 and 5, the ratchet wheel 83 actuates the toothed disc 86 which cooperates with the stationary toothed disc 87 and brings about the return of the punch 18 to its initial position.

The punch 18 is adjusted for different sizes of nuts by means of the link 88 disposed in the cam lever 76 and moving in the curved guide slots 89 to bring the toothed disc 80 always into the same initial position and thus to insure the proper position of the punch 18 during the introducing, flattening and smoothing steps, as indicated in Fig. 4.

The hollow mold formed by the shaping tools 27 is adjusted as to size by the thrust screws 90 by means of which the supporting bearings 33 can be advanced which are withdrawn and secured in position by the screws 91. Since the shaping tools 27 must conform in thickness to the size of the nuts, they are exchangeably disposed in the holders 29.

I claim:—

1. Method of manufacturing nuts, comprising compressing balls to a thickness smaller than that of the finished nuts and imparting to them angular nutlike form by an irislike shaping tool to form a nut of desired height and with a width across flats smaller than that of the flattened ball.

2. Method of manufacturing nuts, comprising compressing balls to a thickness smaller than that of the finished nuts and imparting to them angular nutlike form by shaping tools each constructed at its front ends with a guide surface for adjacent tools arranged in iris shape, said guide surfaces extending obliquely to the pressure direction of the shaping tools to form a nut of desired height and with a width across flats smaller than that of the flattened balls.

3. In a machine for pressing nuts from balls, a prismatic iris-like hollow mold fashioned of a plurality of relatively movable shaping tools, a casing for the mold, a plunger on one side of said mold and a matrix on the other side thereof cooperating with said plunger to effect flattening of the balls, a punch centrally guided in said plunger for piercing the nuts formed, a bore in said matrix for receiving the waste material driven out by said punch, an ejecting mandrel displaceable in said bore for centering and preparatorily piercing the nut blank, means on the frame of the machine for carrying said matrix, means on the frame of the machine for carrying said plunger, a driving shaft for the machine, means for moving said matrix and plunger in timed relation to said driving shaft, means for controlling the motion of the shaping tools in said mold, a ball feeding device adapted to feed one ball into said mold after each operation, and a discharge device for the finished nuts.

4. In a machine for pressing nuts from balls, a prismatic irislike hollow mold fashioned of a plurality of shaping tools, a casing for the mold, a plunger on one side of the mold and a matrix on the other side thereof cooperating with said plunger to effect flattening of the balls, a punch centrally guided in said plunger for piercing the nuts formed, a bore in said matrix for receiving the waste material driven out by said punch, an ejecting mandrel displaceable in said bore for centering and preparatorily piercing the nut blank, a carriage guided in the machine frame for carrying said plunger, a second carriage guided in the frame for carrying said matrix, a driving shaft disposed in the frame, gear wheels on said shaft, cam members rotatably arranged in the frame on a level with the carriages and rotating in a path at right angles to the longitudinal axis of the carriages, said cam members being provided with gear teeth on their outer circumferences, cam followers on the carriages adapted to engage said cam members, intermediate gears for transmitting motion from said gear wheels on said shaft to said cam members, a controlling device on said shaft for actuating the shaping tools of said mold, a ball feeding device adapted to feed one ball into said mold after each operation, and a discharge device for the finished nuts.

5. A machine according to claim 4 in which the shaping tools are each constructed at their front ends with a guide surface for adjacent tools, said guide surfaces extending obliquely to the direction of pressure of the shaping tools.

6. A machine according to claim 4 in which the casing for the mold is stationary, a radially slotted ring member rotatably disposed in said casing, an adjusting lever connected with said ring member, sliding members guided by the slots in said ring member, holders for the shaping tools hingedly secured in said sliding members, and supporting bearings in said casing and hinge bolts for articulating said sliding members to said supporting bearings, the size of the shape formed between the front ends of the shaping tools being varied by displacing said ring member relative to said casing.

7. A machine according to claim 4 in which the casing for the mold is stationary, a radially slotted ring member rotatably disposed in said casing, an adjusting lever connected with said ring member, sliding members guided by the slots in said ring member, holders for the shaping tools hingedly secured in said sliding members, compression springs disposed in said casing and acting on said holders, supporting bearings in said casing and hinge bolts for articulating said sliding members to said supporting bearings, the size of the shape formed between the front ends of the shaping tools being varied by displacing said ring member relative to said casing.

8. In a machine according to claim 4, a controlling device for said mandrel on the carriage bearing the matrix, a control cam on the driving shaft, rods connecting said control device for the mandrel with said control cam on the driving shaft, said control device and cam being constructed so as to operate in the cycle of action of the plunger and matrix.

9. In a machine according to claim 4, a controlling device for said punch on the carriage bearing the plunger, a control cam on the driving shaft, and rods connecting said control device for the punch with said control cam on the driving shaft, said control device and cam being constructed so as to operate in the cycle of action of the plunger and matrix.

10. In a machine according to claim 4, a controlling device for said mandrel on the carriage bearing the matrix, said controlling device consisting of two cooperating toothed discs, one of said discs being connected to the mandrel and the other disc being adapted to be turned relative to the first disc by means of a connecting rod, a control cam on the driving shaft, and rods connecting said control device for the mandrel with said control cam on the driving shaft, said control device and cam being constructed so as to operate in the cycle of action of the plunger and matrix.

11. In a machine according to claim 4, a catch chute for discharging the nut core, a control device influenced by the carriage carrying the matrix for putting said catch chute onto the mold when a new ball is fed and a core ejected from the mandrel, and means preventing the new ball being fed from rolling down said catch chute.

12. In a machine according to claim 4, a catch chute for discharging the nut core, a control device comprising a double lever rotatably positioned on the casing, one end of said double lever being articulated to said catch chute, a tension spring influencing said double lever to normally hold the catch chute against one side of the mold, and a bolt disposed on the matrix carriage and cooperating with the free end of said double lever, whereby the catch chute is withdrawn from the mold when the matrix carriage is advanced.

13. In a machine according to claim 4, an oscillatory member and a stationary member disposed within said oscillatory member for forming a ball feeding device, a delivery pipe connected to said oscillatory member for feeding balls to the mold, a feed pipe for the balls, an inlet opening in said oscillatory member cooperating with said feed pipe, and bridges on said stationary member, said bridges being arranged so as to cause a ball to be passed into said delivery pipe and a fresh ball to be taken from said feed pipe at each motion of said oscillatory member.

WILHELM NUSSBAUM.